United States Patent
Ritz et al.

(10) Patent No.: US 6,760,166 B2
(45) Date of Patent: Jul. 6, 2004

(54) AXIALLY DISPLACEABLE ALIGNING MOUNT FOR OPTICAL COMPONENTS, AND METHOD FOR ITS MANUFACTURE

(75) Inventors: Albert Ritz, Balgach (CH); Otto Geschwentner, Balgach (CH); Peter Soppelsa, Balgach (CH); Heinz Zimmermann, Balgach (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 10/382,603

(22) Filed: Mar. 6, 2003

(65) Prior Publication Data

US 2003/0169519 A1 Sep. 11, 2003

(30) Foreign Application Priority Data

Mar. 6, 2002 (DE) ......................................... 102 09 938

(51) Int. Cl.[7] ................................................ G02B 7/02
(52) U.S. Cl. ........................................ 359/822; 359/819
(58) Field of Search ................................. 359/819, 822, 359/823, 824, 694, 813, 814

(56) References Cited

U.S. PATENT DOCUMENTS

| | | | | |
|---|---|---|---|---|
| 2,894,430 A | * | 7/1959 | Schuch | 359/830 |
| 5,521,764 A | * | 5/1996 | Balogh et al. | 359/824 |
| 6,590,720 B2 | * | 7/2003 | Oba | 359/819 |

* cited by examiner

*Primary Examiner*—Ricky Mack
(74) *Attorney, Agent, or Firm*—Davidson, Davidson & Kappel, LLC

(57) ABSTRACT

A zero-clearance, axially displaceable aligning mount system for optical components includes an unthreaded mount receptacle having a transverse orifice and includes an aligning mount carrying lens elements or lens combinations. A cured plastic casting compound forms a thread substitute in the region of the transverse orifice and beyond it. Coating of this region with an antiadhesion agent, prior to application of the casting compound in pasty form, prevents the molded threads from sticking.

12 Claims, 1 Drawing Sheet

AXIALLY DISPLACEABLE ALIGNING MOUNT FOR OPTICAL COMPONENTS, AND METHOD FOR ITS MANUFACTURE

CROSS REFERENCE TO RELATED APPLICATIONS

This application claims priority to German patent application 102 09 938.3, which is hereby incorporated by reference herein.

BACKGROUND

The application concerns an axially displaceable aligning mount for optical components, in particular for lens elements or lens combinations of zoom systems, and a method for its manufacture.

BACKGROUND OF THE INVENTION

In optical zoom systems, individual lens members or cemented lens combinations are arranged axially displaceably so that parfocality over the entire zoom range can be set and retained. Whenever possible, no tilting of the lens elements or of their mounts should occur during translations of this kind, since decentering can result therefrom and cause a degradation of the image quality of the overall optical system.

A known aligning mount 11 is depicted in FIG. 1. It has a passthrough transport thread 12 that corresponds to a corresponding internal thread of a mount receptacle 10. A cemented lens member L and a further individual lens element are retained in aligning mount 11 in known fashion. With exact positioning, the optical axes of lens elements L coincide with the optical axis of the overall system. A disadvantage of this aligning mount 11 is that because of the thread clearance that is present, the risk of a large tilt of this aligning mount exists, resulting in the aforementioned degradations of image quality.

A further known aligning mount has a transport thread having one guidance diameter at the mount receptacle and at the actual aligning mount. It is disadvantageous here that the transport thread shortens the guidance length, which is labeled F in each of the Figures. In addition, the external mount receptacle also requires an internal thread, which greatly increases manufacturing costs.

In a further known aligning mount, one transport thread as well as two different guidance diameters, at the mount receptacle and the actual aligning mount, are provided. It is disadvantageous that the guidance diameters must be manufactured in separate operations, and that adaptation of the guidance diameters of the mount receptacle and aligning mount is possible only with great effort.

Another known aligning mount is shown in FIG. 2. Over the entire guidance length F, two identical guidance diameters and one transport thread 12a are provided in the center region between the guidance diameters at aligning mount 11a, as well as a passthrough guidance diameter, without a thread, at mount receptacle 10a.

Through a lateral orifice 13 with an internal thread in mount receptacle 10a, which for that reason must have a large wall thickness Wa, a resilient ball 15 is pressed into the thread and held by a retaining screw 14. Ball 15 engages partially into transport thread 12a and effects an axial motion upon rotation of aligning mount 11a. In this known mount, it is disadvantageous that a large wall thickness Wa of mount receptacle 10a is needed in order to receive resilient ball 15 and retaining screw 14. In addition, ball 15 exerts a force on mount 11a that can result in a deformation of the aligning mount and in a consequent distortion of the lens elements.

SUMMARY OF THE INVENTION

An object of the present invention is therefore to provide an axially displaceable aligning mount that does not exhibit the aforesaid disadvantages and that allows low-tilt axial translations to be performed. A further object is to provide a method for manufacturing an accurately centered and accurately aligned axially displaceable aligning mount.

The present invention provide an axially displaceable aligning mount for optical components, in particular for lens elements and/or lens combinations of zoom systems. The aligning mount according to the present invention includes a) a mount receptacle having a cylindrical orifice, the mount receptacle having at least one transverse opening in its center region; b) an aligning mount, receiving the lens elements or lens combinations, that has a cylindrical guidance diameter in its two end regions and a transport thread in its center region. The cylindrical guidance diameter (D) of the mount receptacle (20) is embodied in internally unthreaded fashion. The diameter of the transport thread (22) is no greater than the guidance diameter (D). Moreover, the transverse opening (23) has, in its region facing toward the transport thread (22) and in the associated thread region, a one-piece threaded segment (24).

Advantages of the arrangement and method according to the present invention include the fact that an arrangement that economizes on material and reduces costs is obtained, in which tilting during the translation operation is drastically reduced or minimized as compared to known approaches. The mount receptacle can be of simpler configuration, in particular even if only thin wall thicknesses can be allowed or are dictated by the design.

BRIEF DESCRIPTION OF THE DRAWINGS

The present invention is elaborated upon below with reference to the drawings in which.

DETAILED DESCRIPTION

Figure 1:
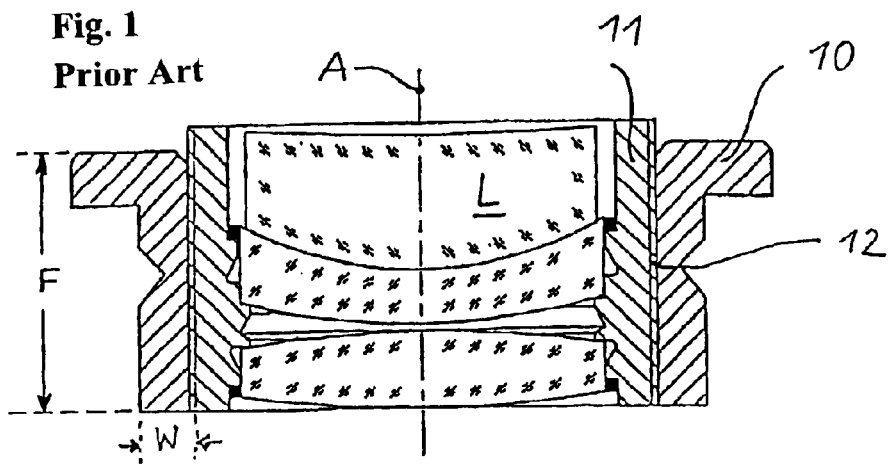
FIG. 1 shows a schematic diagram of a prior art aligning mount having a passthrough transport thread.
Figure 2:
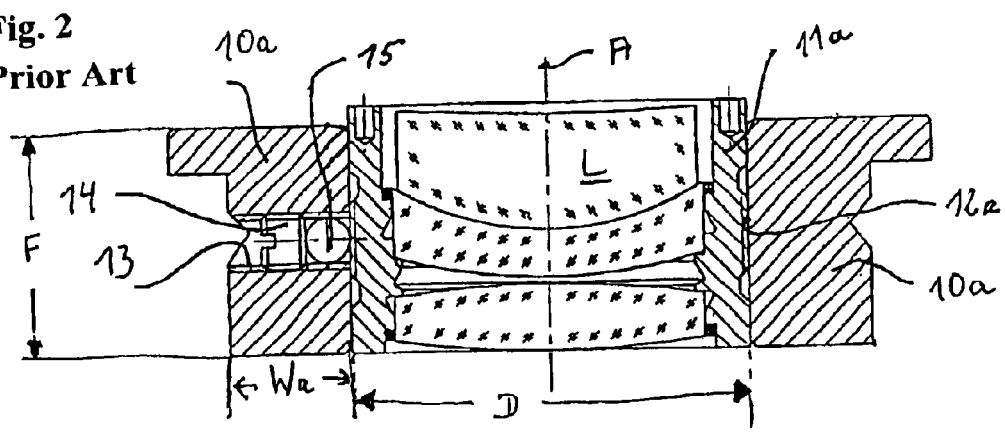
FIG. 2 shows a schematic diagram of another prior art aligning mount having an unthreaded mount receptacle.

FIGS. 1 and 2 have already been substantially explained above in order to illustrate the existing art. The so-called guidance length F and guidance diameter D are noteworthy. The large wall thickness Wa in FIG. 2 is conspicuous: it is necessary so that ball 15 and retaining screw 14 positioned in transverse orifice 13 can be accommodated completely.

Figure 3:
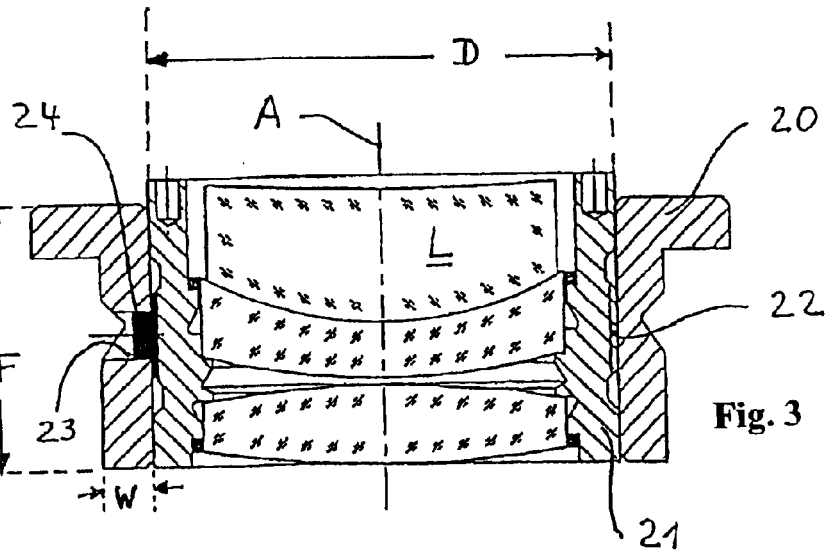
FIG. 3 shows a schematic diagram of an aligning mount according to an embodiment of the present invention having an unthreaded thin-walled mount receptacle.

FIG. 3 depicts an embodiment according to the present invention. The lens elements depicted, including lens elements L, are cemented in perfectly centered fashion, in a known manner, in aligning mount 21. The cylindrical external region of aligning mount 21 has in its central region a transport thread 22 that possesses no corresponding counterpart on the internal side of mount receptacle 20. Mount receptacle 20, with its thin wall thickness W, therefore has no thread in its interior over the entire region of guidance length F. Cylindrical unthreaded guidance surfaces with guidance diameter D are present in the upper and lower external region of aligning mount 21. Mount receptacle 20 has an unthreaded transverse orifice 23 that runs substantially perpendicular to the axis of mount receptacle 20 and to optical axis A of the system.

Preassembly of aligning mount 21 as shown in FIG. 3 is accomplished in a manner known per se. That region of transport thread 22 facing toward borehole 23 is then first coated with an antiadhesion agent. Coating can be performed by the fact that, for example, a thin layer of grease or wax is brushed or sprayed onto the corresponding thread region. Alternatively, a thin Teflon layer could also be applied. A pasty plastic casting compound, which later cures, is then introduced into borehole 23 in such a way that it conformingly fills up the latter's internal region facing toward aligning mount 24, as well as the associated region of transport thread 22 coated with the antiadhesion agent. After casting compound 24 has cured, a threaded segment has been produced, so to speak, in situ, and in the intended region completely fills up both the interstices defined by the design and those resulting from production. It is significant that production of mount components with a greater manufacturing tolerance can be accepted as a result of this "thread casting" technique according to the present invention, resulting in more economical production conditions.

The antiadhesion coating reliably prevents any adhesion to the "mold" (i.e., the threaded part). The cured compound 24 has become, in situ, a zero-clearance thread substitute. This permits precise displacement of aligning mount 21 and has the effect that once centering and alignment of the optical system have been performed, they and therefore the requisite parfocality (in the context of a zoom system) are retained.

The arrangement according to the present invention advantageously has only one passthrough diameter D of maximum length F with no internal thread (which is complex in terms of production engineering) of mount receptacle 20. The maximum guidance length F thus prevents any tilting of aligning mount 21 that might otherwise occur as a result of tolerances in D. The method according to the present invention is usable even with thin wall thicknesses W. A further advantage is that the cured plastic casting compound 23 exerts no destabilizing or decentering force on aligning mount 21.

The invention has been explained with reference to FIG. 3, in which only one transverse orifice 23 is provided. It is of course within the context of the present invention to provide two or more (preferably identical) orifices. These can lie in one plane that is arranged perpendicular to the axis of the cylindrical mount. It is nevertheless also possible to provide in aligning mount 21 two or more orifices that lie on different planes.

The invention is not limited to the alignment of lens members. It can also be used for the alignment of further precision mechanical optical components, e.g., for exact axially perpendicular positioning of mirrors and/or prisms and/or reticles, and for axial displacement of aligned laser diodes and/or apertures and/or glass fiber exit surfaces and/or mechanical precision contact surfaces.

What is claimed is:

1. An axially displaceable aligning mount system for at least one optical component, comprising:

an aligning mount configured to receive the at least one optical component, the aligning mount including cylindrical end regions having a guidance diameter and including a transport thread in a central region of the aligning mount, a diameter of the transport thread being no greater than the guidance diameter; and a mount receptacle including:
a cylindrical orifice having the guidance diameter and being unthreaded;
at least one transverse opening in a central region of the mount receptacle;
a one-piece threaded segment at least partially disposed in a region of the transverse opening facing the transport thread and in a region of the transport thread.

2. The aligning mount system as recited in claim 1 wherein the at least one optical component includes at least one of a lens element and a lens combination of a zoom system.

3. The aligning mount system us recited in claim 1 wherein the at least one optical component includes an optical component combination.

4. The aligning mount system as recited in claim 1 wherein the transverse opening includes an internally unthreaded orifice.

5. The aligning mount system as recited in claim 1 wherein the one-piece threaded segment includes a plastic material, contacts the transport thread and forms a conforming casting of the transport thread in a region of the contact with the transport thread.

6. The aligning mount system as recited in claim 1 wherein the one-piece threaded segment extends along the transport thread beyond a diameter of the transverse opening.

7. The aligning mount system as recited in claim 5 wherein the plastic material includes a curing, geometrically stable compound.

8. The aligning mount system as recited in claim 5 wherein the plastic material includes Araldite.

9. The aligning mount system as recited in claim 1 wherein the mount receptacle includes at least a second transverse opening in the central region of the mount receptacle, a second one-piece threaded segment being at least partially disposed in a respective region of the second transverse opening, each of the one-piece threaded segment and the second one-piece threaded segment including a curing compound.

10. The aligning mount system as recited in claim 1 wherein the transport thread has an antiadhesion coating disposed thereon in a region of contact of the transport thread with the one-piece threaded segment.

11. The aligning mount system as recited in claim 10 wherein the antiadhesion coating includes at least one of a grease and a wax.

12. The aligning mount system as recited in claim 1 wherein the at feast one optical component includes at toast one of a mirror, an aperture, a reticle, a diode, a glass fiber exit surface, and a mechanical precision contact surface.

* * * * *